Oct. 4, 1927.

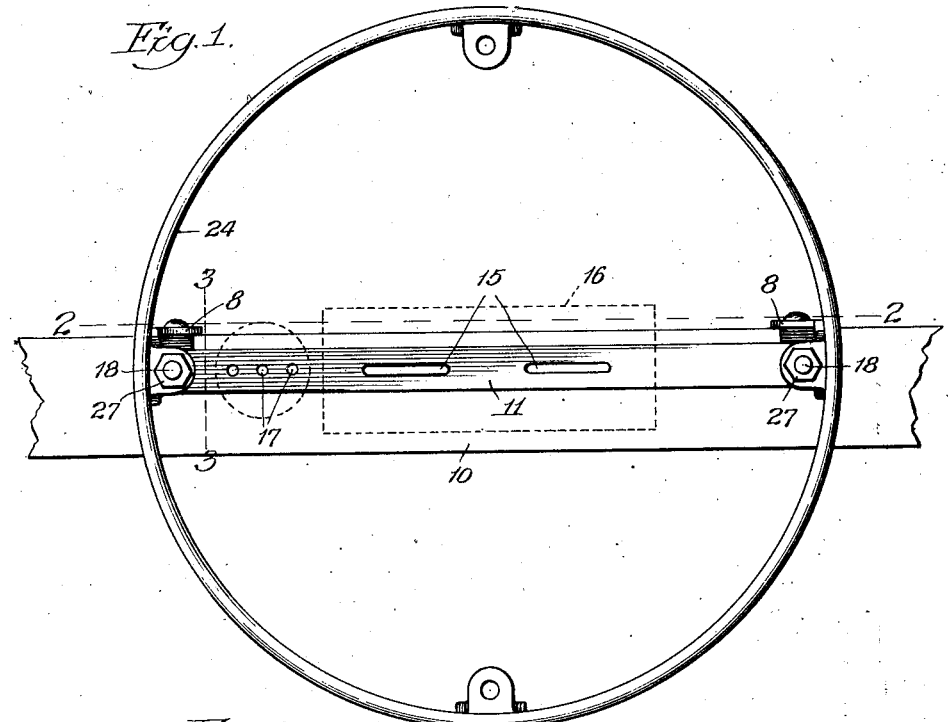
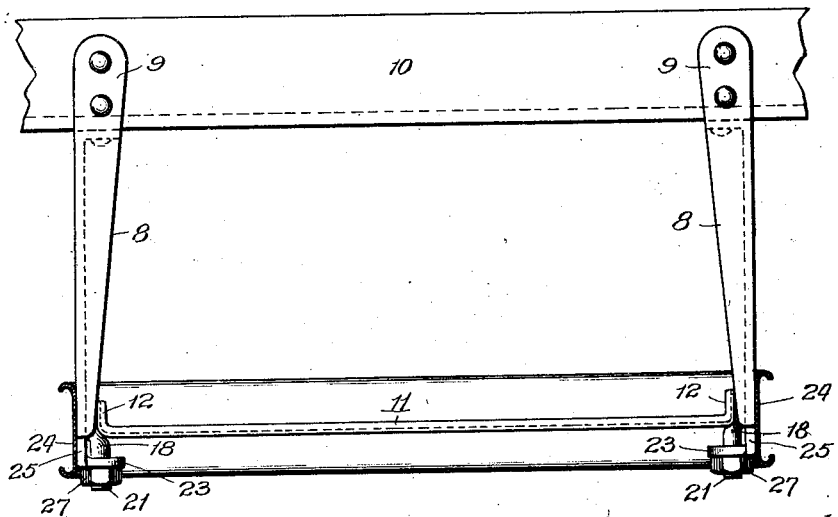

H. TAYLOR 1,644,159

DEMOUNTABLE RIM CARRIER

Filed Jan. 5, 1920

2 Sheets-Sheet 2

Witness:
John Enders

Inventor
Huston Taylor
by Fred Gerlach
his Atty.

Patented Oct. 4, 1927.

1,644,159

UNITED STATES PATENT OFFICE.

HUSTON TAYLOR, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

DEMOUNTABLE-RIM CARRIER.

Application filed January 5, 1920. Serial No. 349,414.

The invention relates to demountable-rim carriers, and its object is to provide an improved carrier which is simple in construction and by which a rim with lugs rigidly secured thereon may be securely supported from a motor vehicle.

The invention consists in the several novel features hereinafter set forth and more particularly defined by the claims at the conclusion hereof.

Figure 3:
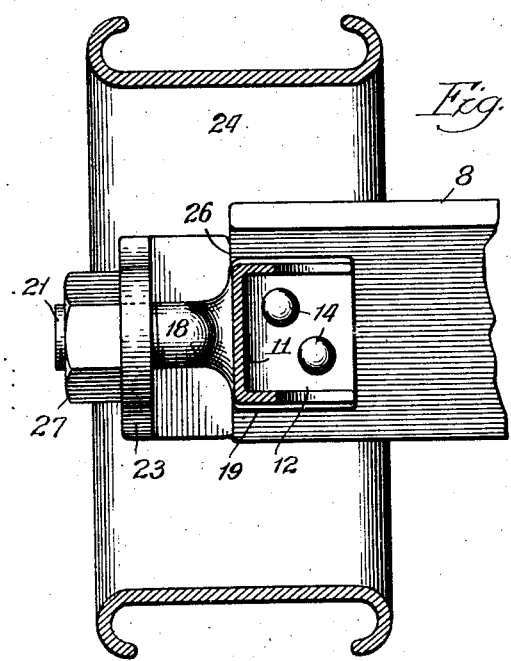
Figure 4:
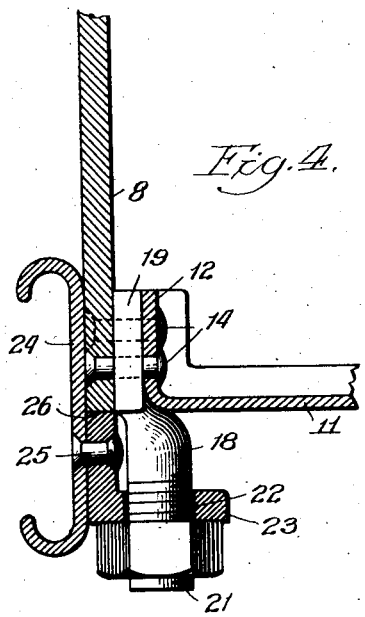
Figure 5:
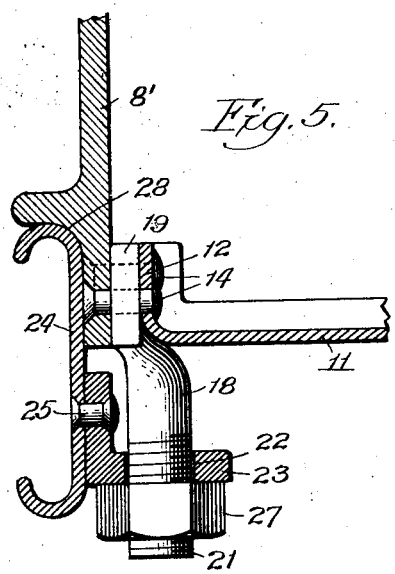
Figure 6:
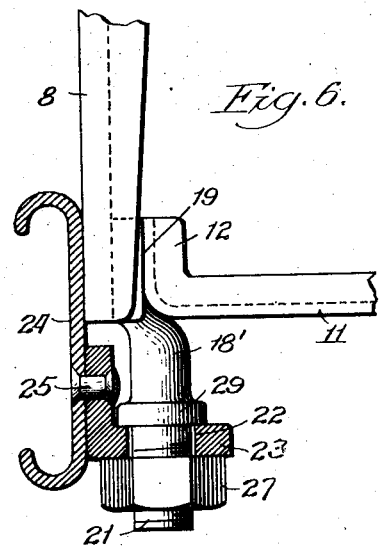

In the drawings: Fig. 1 is a rear elevation of a carrier embodying the invention. Fig. 2 is a horizontal section taken on line 2—2 of Fig. 1. Fig. 3 is a vertical section taken on line 3—3 of Fig. 1. Fig. 4 is a detail section on an enlarged scale showing one of the devices for securing the rim on the carrier. Fig. 5 is a similar view of another form of the invention. Fig. 6 is a similar view of still another form of the invention.

The improved carrier comprises a pair of supporting members or brackets 8 which have their front ends suitably formed, as at 9, for attachment to a cross bar or portion 10 of the frame of a vehicle. These brackets are disposed adjacent the sides of the vehicle and their rear ends are rigidly cross connected by a bar 11 which is formed with angular ends 12. The latter are secured to the brackets respectively by rivets 14. The bar 11 is preferably channel-shaped in cross section so that it forms an efficient cross connection between the supports 8. This bar is provided with slots 15 to receive bolts whereby a license plate 16 may be supported from the bar and also with holes 17 whereby a lamp-supporting bracket may be secured to said bar. A characteristic of the present invention is that this cross bar constitutes the sole connection between the rear ends of the supporting brackets so that a supporting ring may be dispensed with.

One object of the present invention is to secure a demountable rim to the carrier in such manner that a supporting ring may be dispensed with and for this purpose a pair of securing devices are provided and these are secured directly to the brackets. Each of said devices comprises a bolt 18 provided with a flat portion 19 between one end 12 of the cross-bar and one of the inner sides of a bracket 8. The bolts are rigidly secured to the brackets and cross-bar by rivets 14. Each bolt is also provided with a screw-threaded shank 21 which is adapted to pass through an opening 22 in an angular lug 23 which is secured to the inner periphery of the rim 24 by one or more rivets 25. The inner end of each lug 23 is provided with a face 26 which is adapted to abut against the end of one of the brackets 8. A nut 27 on the end of each bolt 18 is adapted to force the lug 23 inwardly against said abutment to firmly clamp the lug and hold the rim on the carrier.

In Fig. 5, there is shown a form of the invention in which each supporting arm 8' is provided with an outwardly projecting lug having a tapered seat 28 for the inner side of the rim 26 so that each nut 27 will, through lug 23, clamp the rim on the tapered seat on the bracket.

In Fig. 6, there is shown another form of the invention in which the bolt 18' is provided with a shoulder 29 which will be engaged by the inner face of the lug 23, so that the lug will be positively clamped between said shoulder and the nut.

In practice, the lugs, through which the bolts pass, may be utilized to secure the rim on the body of the wheel and for that purpose the rim will be equipped with a sufficient number of lugs so that it will be effectively secured in place. In this manner, the lugs are utilized both in attaching the rim to the wheel, as well as on the carrier.

The invention exemplifies an improved demountable rim and tire carrier which is simple in construction and in which lugs rigidly secured on the rim are utilized in securing the rim on the carrier.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In combination with a demountable tire rim provided with a plurality of oppositely disposed lugs rigidly secured thereto, each lug having a transverse opening extending therethrough, a carrier comprising a pair of supporting brackets adapted to be attached to a vehicle body, a cross bar, bolts adapted to extend through the openings in the lugs respectively, said bar, brackets and bolts being rigidly connected and nuts for removably clamping said lugs on the bolts.

2. In combination with a demountable tire rim provided with a plurality of oppositely disposed lugs rigidly secured thereto, each lug having a transverse opening extending therethrough, a carrier comprising a pair of supporting brackets adapted to be attached to a vehicle body, bolts rigidly connected to the outer ends of said brackets and adapted to extend through the openings in the lugs respectively, nuts for removably clamping said lugs on said bolts, a cross bar, and means for conjointly and rigidly connecting the brackets, bolts and the outer ends of said bar together.

3. In combination with a demountable tire rim provided with a plurality of oppositely disposed lugs rigidly secured thereto, each lug having a transverse opening extending therethrough, a carrier comprising a pair of supporting brackets adapted to be attached to a vehicle body, a cross bar having inwardly extending flanges at its ends, bolts disposed between said flanges and the outer ends of said brackets and adapted to extend through the openings in the lugs respectively, said brackets, bolts and flanges being rigidly connected together, and nuts for removably clamping the lugs on said bolts.

4. The combination with a bar suitably supported, of a demountable tire carrying rim adapted to embrace said bar, apertured lugs connected to said rim and bolts carried by said bar and adapted to engage the apertured lugs on said rim, and nuts screwed upon said bolts for securing the rim to the bar.

5. A carrier for rims having a plurality of attached, spaced, apertured securing lugs comprising brackets adapted to be secured to the body of a vehicle, a plurality of rearwardly projecting studs carried by said brackets and so spaced as to fit certain of the apertured lugs of the rim, and nuts screwed on said studs and adapted to engage said lugs.

6. A carrier for rims having a plurality of spaced, attached, apertured securing lugs comprising brackets adapted to be secured to the body of a vehicle, a cross-bar supported by said brackets, a plurality of rearwardly projecting studs carried by said cross-bar and so spaced as to fit certain of the apertured lugs of the rim, and nuts screwed on said studs and adapted to engage said lugs.

HUSTON TAYLOR.